(12) United States Patent
Iwamoto

(10) Patent No.: US 9,100,623 B2
(45) Date of Patent: Aug. 4, 2015

(54) IMAGE PROCESSING DEVICE AND METHOD FOR ADDING TEXTURES TO BACKGROUND AND TO AN OBJECT

(75) Inventor: Kohei Iwamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 45 days.

(21) Appl. No.: 13/477,380

(22) Filed: May 22, 2012

(65) Prior Publication Data

US 2012/0300233 A1    Nov. 29, 2012

(30) Foreign Application Priority Data

May 23, 2011   (JP) ................................ 2011-114365

(51) Int. Cl.
*G06T 15/04* (2011.01)
*H04N 1/60* (2006.01)
*H04N 1/40* (2006.01)

(52) U.S. Cl.
CPC ............. *H04N 1/60* (2013.01); *H04N 1/40012* (2013.01); *H04N 1/6058* (2013.01)

(58) Field of Classification Search
CPC ..... H04N 1/60; H04N 1/6002; H04N 1/6058; H04N 1/62; H04N 1/64; H04N 1/387; G06K 15/1276; G06K 15/128; G06K 15/1832; G06K 15/1878; G06K 15/1885
See application file for complete search history.

(56) References Cited

U.S. PATENT DOCUMENTS

| | | | |
|---|---|---|---|
| 5,751,434 A | 5/1998 | Narendranath et al. | |
| 6,246,805 B1 * | 6/2001 | Sanjeev et al. | 382/285 |
| 2004/0156544 A1 | 8/2004 | Kajihara | |
| 2006/0152522 A1 * | 7/2006 | Strassenburg-Kleciak et al. | 345/582 |
| 2007/0035755 A1 * | 2/2007 | Maki et al. | 358/1.9 |
| 2008/0079962 A1 | 4/2008 | Torikoshi | |
| 2008/0205518 A1 * | 8/2008 | Wilinski et al. | 375/240.08 |
| 2008/0259367 A1 | 10/2008 | Oka | |
| 2009/0060326 A1 | 3/2009 | Imai et al. | |
| 2009/0116046 A1 * | 5/2009 | Nakashio | 358/1.9 |
| 2009/0207433 A1 * | 8/2009 | Wang et al. | 358/1.11 |
| 2010/0183223 A1 * | 7/2010 | Matsuoka | 382/166 |
| 2010/0232696 A1 * | 9/2010 | Funakura et al. | 382/167 |
| 2011/0063468 A1 * | 3/2011 | Ahn et al. | 348/222.1 |
| 2011/0134448 A1 * | 6/2011 | Lee | 358/1.9 |

FOREIGN PATENT DOCUMENTS

| | | |
|---|---|---|
| EP | 2175414 A1 | 4/2010 |
| JP | 2009-232096 A | 10/2000 |
| JP | 2004-192614 A | 7/2004 |
| JP | 2006-108723 A | 4/2006 |
| JP | 2007-013666 A | 1/2007 |
| JP | 2008-135006 A | 6/2008 |
| JP | 2008-271045 A | 11/2008 |
| JP | 2009-055465 A | 3/2009 |
| JP | 2009-071695 A | 4/2009 |
| JP | 2009-128396 A | 6/2009 |
| JP | 2011-018280 A | 1/2011 |

OTHER PUBLICATIONS

The extended European Search Report for European Application No. 12168645.5 mailed Jul. 1, 2014.

* cited by examiner

*Primary Examiner* — Benny Q Tieu
*Assistant Examiner* — Haris Sabah
(74) *Attorney, Agent, or Firm* — Global IP Counselors, LLP

(57) ABSTRACT

An image processing device includes an image processing part configured to perform image processing to an original image including a background and an object by adding a first texture component to at least the background.

11 Claims, 13 Drawing Sheets

Fig. 5A  ALL
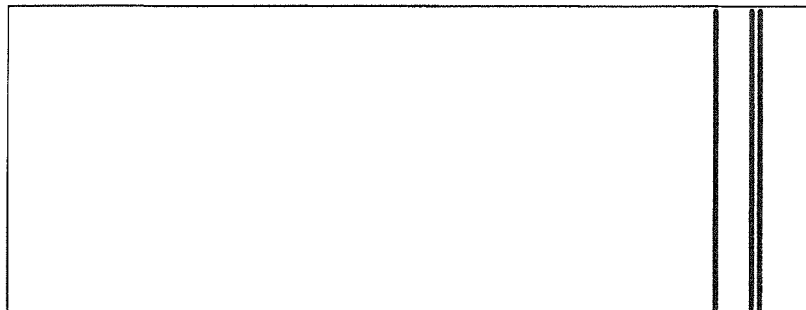
Fig. 5B  RED
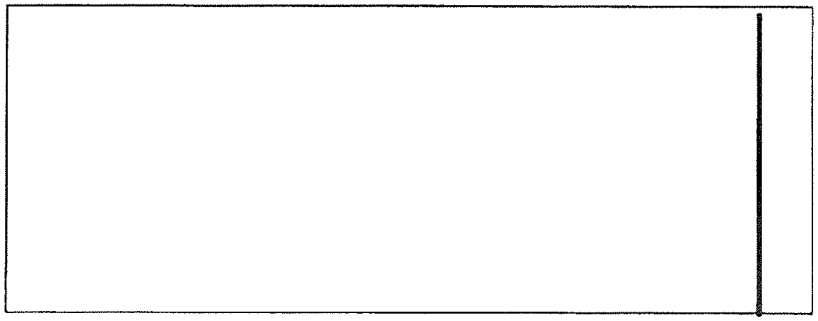
Fig. 5C  GREEN
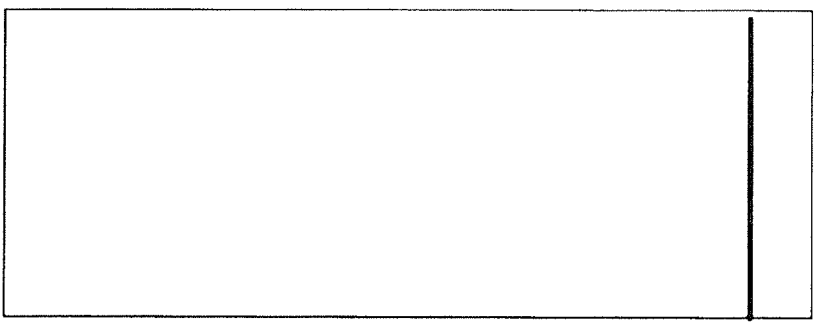
Fig. 5D  BLUE
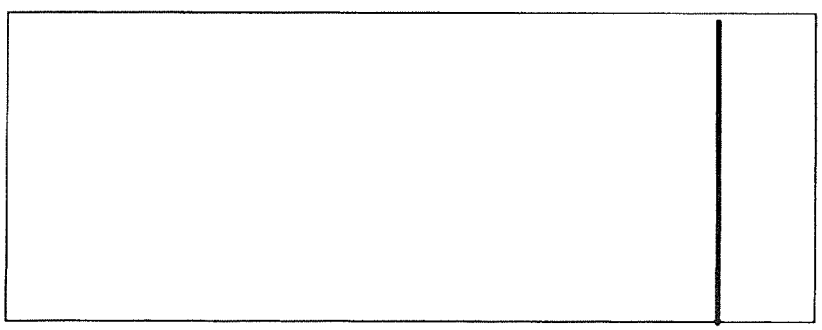

Fig. 6A  ALL
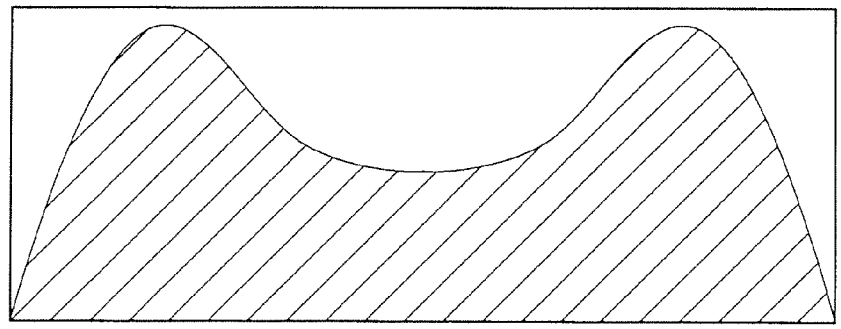
Fig. 6B  RED
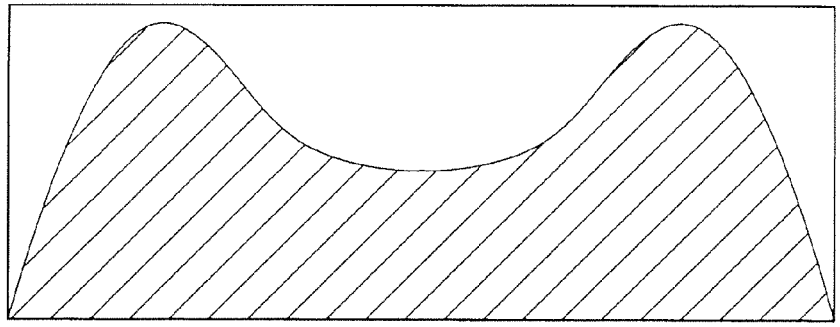
Fig. 6C  GREEN
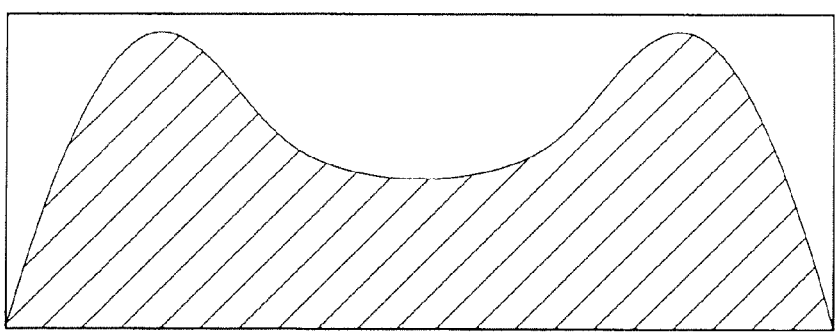
Fig. 6D  BLUE
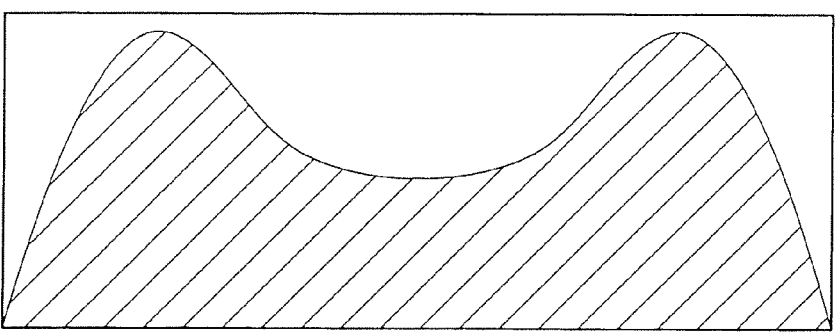

Fig. 9A  ALL
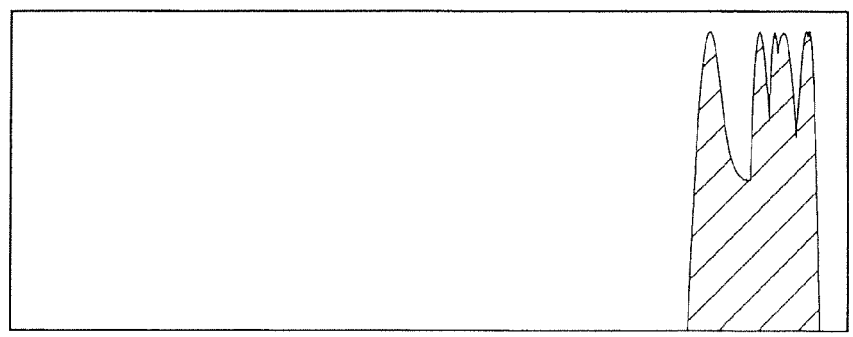
Fig. 9B  RED
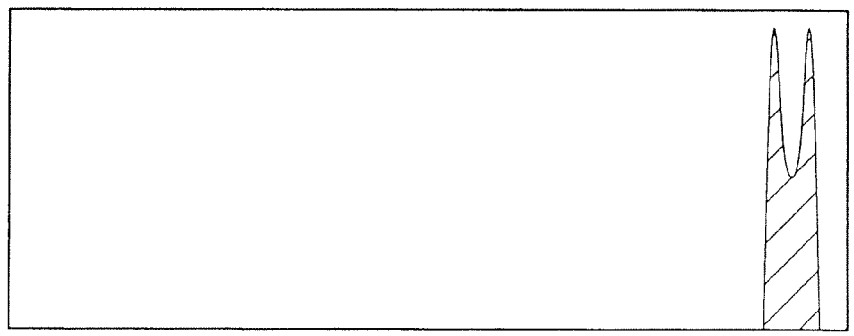
Fig. 9C  GREEN
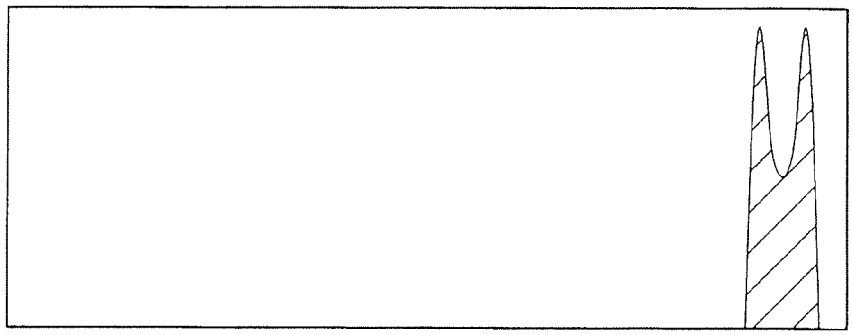
Fig. 9D  BLUE
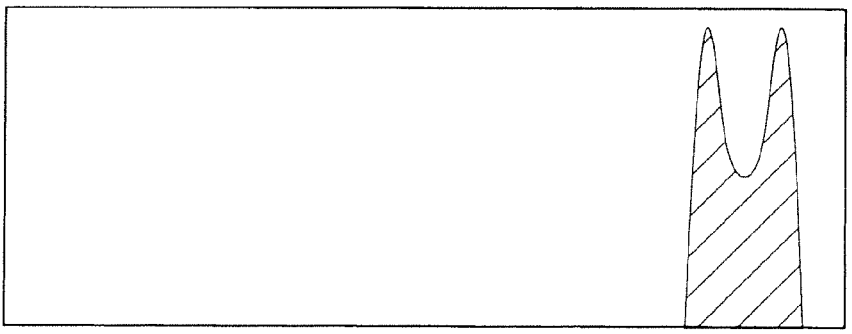

Fig. 11A  ALL
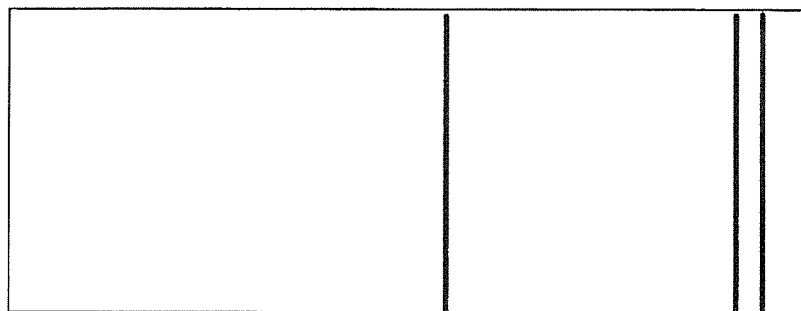
Fig. 11B  RED
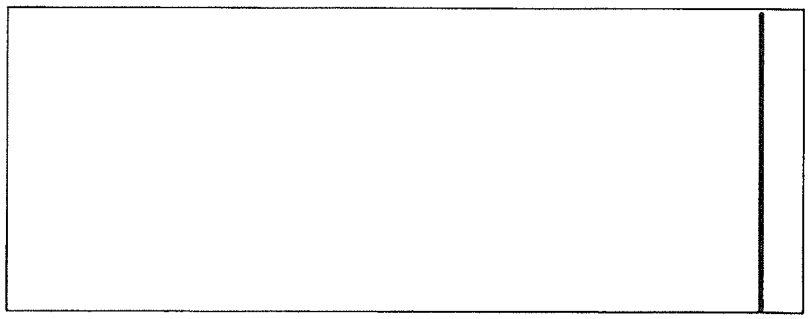
Fig. 11C  GREEN
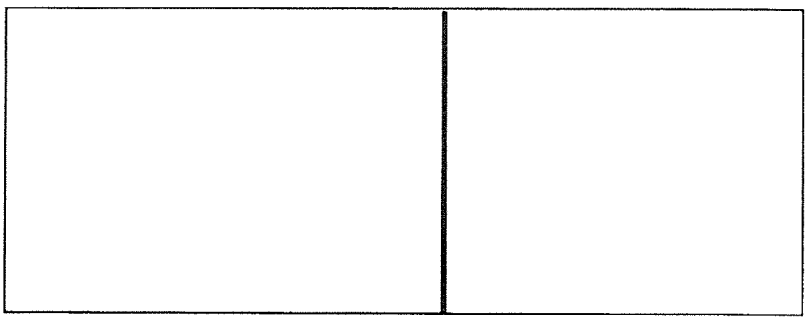
Fig. 11D  BLUE
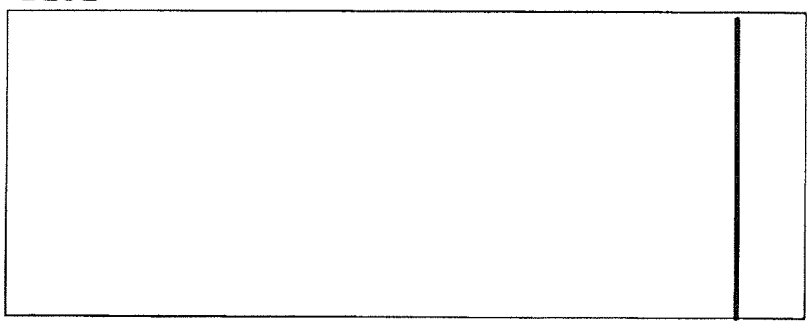

Fig. 12A ALL
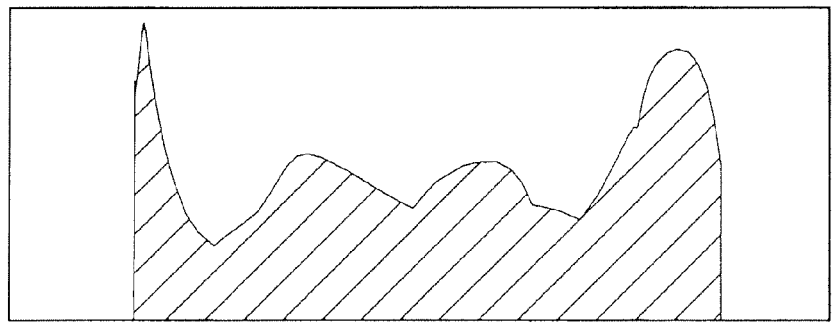
Fig. 12B RED
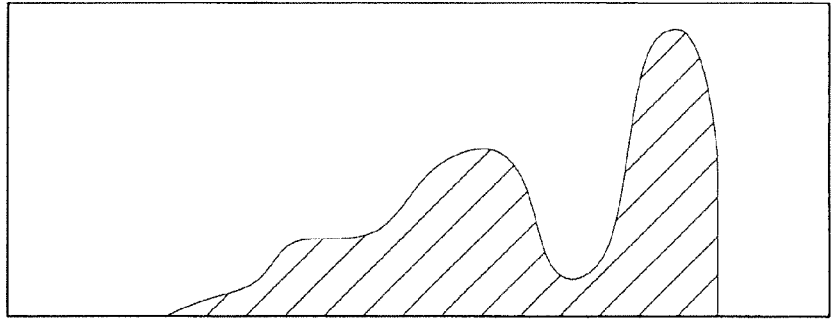
Fig. 12C GREEN
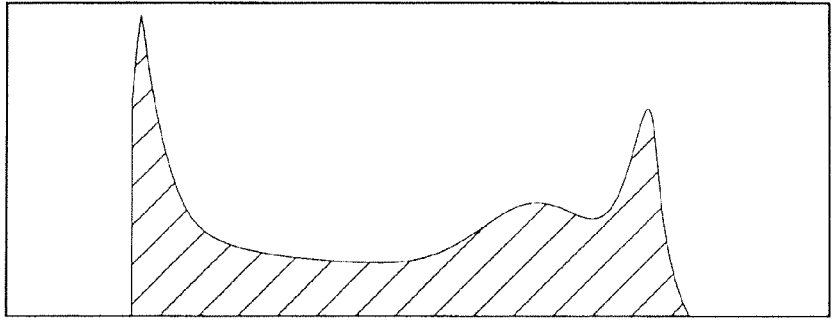
Fig. 12D BLUE
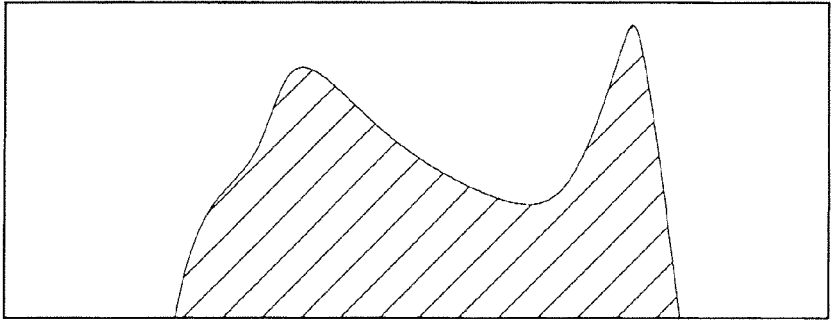

Fig. 14A ALL
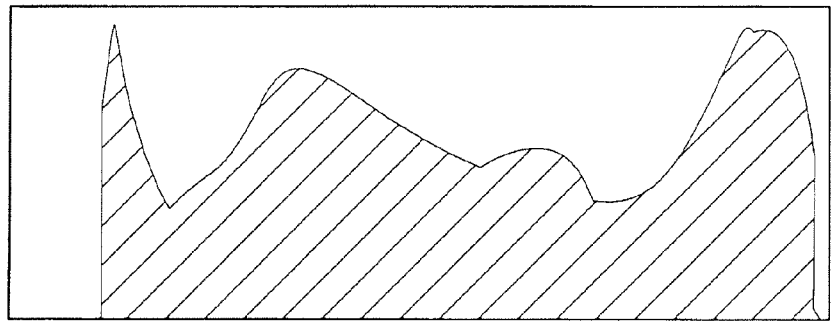
Fig. 14B RED
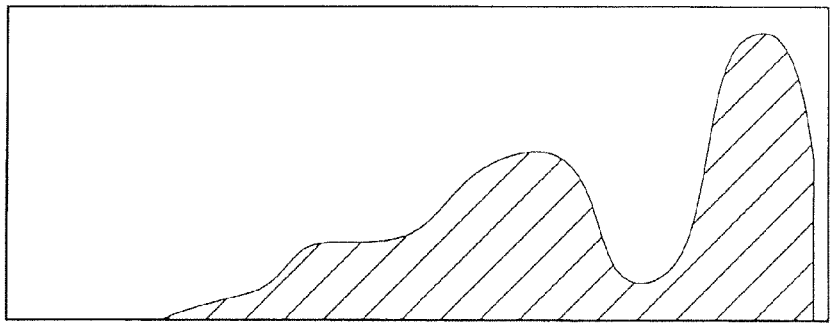
Fig. 14C GREEN
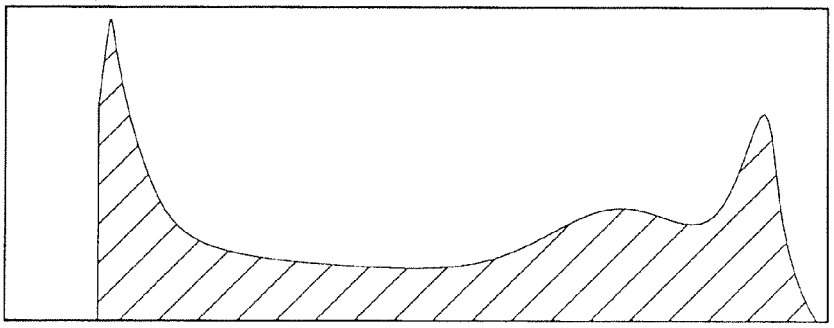
Fig. 14D BLUE
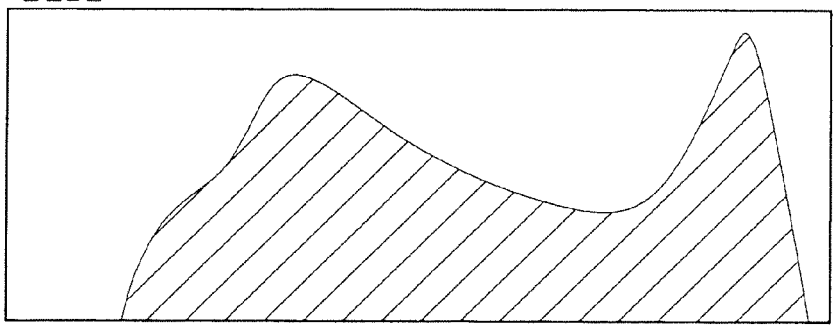

IMAGE PROCESSING DEVICE AND METHOD FOR ADDING TEXTURES TO BACKGROUND AND TO AN OBJECT

CROSS-REFERENCE TO RELATED APPLICATIONS

This application claims priority to Japanese Patent Application No. 2011-114365 filed on May 23, 2011. The entire disclosure of Japanese Patent Application No. 2011-114365 is hereby incorporated herein by reference.

BACKGROUND

1. Technical Field

The present invention relates to an image processing device, an image processing method, and a printed material.

2. Related Art

Conventionally, almost all paper for wrapping goods and the like (hereinafter, referred to as wrapping medium) has been mass-produced by gravure printing with a small variety of product types. There has been demand for small-quantity production of a wrapping medium with a wide variety of product types in order to meet various needs of customers.

Printing by an ink-jet printer in which ink is discharged to a printing medium does not need plate making necessary for gravure printing, and enables small-quantity production with a wide variety of product types. Ink-jet printers can perform printing neatly without smearing or bleeding through by performing printing to special paper having a coating layer. However, since wrapping paper generally used in production of a wrapping medium by gravure printing has no coating layer, when such wrapping paper is used as a printing medium in an ink-jet printer, there are cases where the amount of ink is excessive, and smearing or bleeding through occurs. Thus, there has been a problem with printing by an ink-jet printer using conventional wrapping paper. Further, when the discharge amount of ink is decreased in an ink-jet printer to prevent smearing or bleeding through, there are cases where the color density will be decreased and the image quality will be deteriorated compared to the image quality of gravure printing.

A conventional image processing device is configured to determine a region where lightness is high and a region where is lightness is low in image data, and adjust the discharge amount of ink based on the determination results. Consequently, the amount of ink discharged to printing paper is decreased while unsharpness of a printed image is controlled (e.g., see Japanese Laid-Open Patent Publication No. 2008-271045).

SUMMARY

According to the above-described conventional art, the discharge amount of ink can be decreased. However, the image quality equal to that of gravure printing cannot be obtained in a case of being applied to printing with wrapping paper. Although it may be possible to use special paper having a coating layer compatible with an ink-jet printer as a wrapping medium, it is not always appropriate because special paper has a greater thickness than conventional wrapping paper and is difficult to fold, ink is likely to peel off when folded, the coating layer of special paper may affect an object to be wrapped, and special paper is expensive compared to wrapping paper.

The present invention has been made to address the above-described conventional circumstances, and an object of the present invention is to provide a technology which can decrease the discharge amount of ink while controlling deterioration in image quality in a case of printing an image by an ink-jet printer.

In order to address at least part of the above-described circumstances, the present invention can be implemented as the following embodiments and application examples.

An image processing device according to one aspect of the present invention includes an image processing part configured to perform image processing to an original image including a background and an object by adding a first texture component to at least the background.

In this image processing device, image processing is performed by adding a texture component to a background of an original image. If a texture component is different between the background and the object, the background and the object are discontinuous in terms of depth, and thus the object looks conspicuous compared to the background by visual effects. Consequently, the discharge amount of ink can be decreased while controlling deterioration in image quality even if the amount of ink discharged to a printing medium is smaller than the amount of ink that would be discharged if printing was performed using the original image prior to adding a texture component to the background.

The image processing device according to the above described aspect preferably further includes a print controlling part configured to produce print data for printing by an ink-jet method based on an image, wherein the print controlling part produces the print data such that a discharge amount of ink per unit area is smaller in a print mode in which printing is performed based on the image after the image processing than in a print mode in which printing is performed without the image processing.

In this image processing device, print data in which the discharge amount of ink is small is produced for an ink-jet method. Consequently, the discharge amount of ink can be decreased while controlling deterioration in image quality even if the amount of ink discharged to a printing medium is smaller than the amount of ink that would be discharged if printing was performed using the image prior to adding a texture component.

In the image processing device according to the above described aspect, the image processing preferably includes background color gamut adjustment processing which changes a color gamut of the background in the original image after adding the first texture component.

In this image processing device, since the color gamut of the background after adding the first texture component is changed, the object looks clear with respect to the background by color gamut effects. Consequently, the discharge amount of ink can be decreased while controlling deterioration in image quality even if the amount of ink discharged to a printing medium is smaller than the amount of ink that would be discharged if printing was performed using the image prior to adding a texture component.

In the image processing device according to the above described aspect, the background color gamut adjustment processing is preferably processing which compresses the color gamut of the background in the original image after adding the first texture component.

In this image processing device, since the color gamut of the background after adding the first texture component is compressed, the object looks clear with respect to the background by color gamut effects.

In the image processing device according to the above described aspect, the image processing preferably includes object color gamut adjustment processing which changes a color gamut of the object in the original image.

In this image processing device, since the color gamut of the object is changed, the object looks clear with respect to the background by color gamut effects. Consequently, the discharge amount of ink can be decreased while controlling deterioration in image quality even if the amount of ink discharged to a printing medium is smaller than the amount of ink that would be discharged if printing was performed using the image prior to adding a texture component.

In the image processing device according to the above described aspect, the object color gamut adjustment processing is preferably processing which expands the color gamut of the object in the original image.

In this image processing device, since the color gamut of the object is changed, the object looks clear with respect to the background by color gamut effects.

In the image processing device according to the above described aspect, the image processing preferably includes processing which adds a second texture component to the object.

In this image processing device, the image processing is performed by adding a texture component to the object of the original image. If a texture component is different between the background and the object, the background and the object are discontinuous in terms of depth, and thus the object looks more conspicuous than the background by visual effects compared to a case of adding a texture component only to the background. Consequently, the discharge amount of ink can be decreased while controlling deterioration in image quality even if the amount of ink discharged to a printing medium is smaller than the amount of ink that would be discharged if printing was performed using the image prior to adding a texture component.

In the image processing device according to the above described aspect, the first texture component is preferably a texture component in which a predetermined first pattern is repeated, the second texture component is preferably a texture component in which a predetermined second pattern different from the first pattern is repeated, and a frequency of the first texture component and a frequency of the second texture component are preferably different from each other.

In this image processing device, the texture component added to the background and the texture component added to the object are a texture component in which a predetermined pattern is repeated. Further, the frequency of the texture component added to the background and the frequency of the texture component added to the object are different from each other. Consequently, the background and the object are discontinuous in terms of depth, and thus the object looks conspicuous compared to the background by visual effects.

In the image processing device according to the above described aspect, the frequency of the first texture component is preferably greater than the frequency of the second texture component.

In this image processing device, the frequency of the texture component added to the background is greater than the frequency of the texture component added to the object. Consequently, the background and the object are discontinuous in terms of depth, and thus the object emerges from the background so as to look conspicuous by visual effects.

In the image processing device according to the above described aspect, an amplitude of the first texture component and an amplitude of the second texture component are preferably different from each other.

In this image processing device, the amplitude of the texture component added to the background and the amplitude of the texture component added to the object are different from each other. Consequently, the background and the object are discontinuous in terms of depth, and thus the object looks conspicuous compared to the background by visual effects.

In the image processing device according to the above described aspect, the amplitude of the first texture component is preferably smaller than the amplitude of the second texture component.

In this image processing device, the amplitude of the texture component added to the background is smaller than the amplitude of the texture component added to the object. Consequently, the background and the object are discontinuous in terms of depth, and thus the object emerges from the background so as to look conspicuous by visual effects.

The present invention can be implemented as various embodiments such as an image processing method and device, an image searching method and device, a printing method and device, a computer program for implementing the functions of these methods and devices, a recording medium in which the computer program is recorded, and data signals shaped in carrier waves including a computer program.

BRIEF DESCRIPTION OF THE DRAWINGS

Referring now to the attached drawings which form a part of this original disclosure:

FIGS. 5A to 5D are explanatory diagrams showing an example of a component amount in RGB components of a background BG prior to adding a texture component.

FIGS. 6A to 6D are explanatory diagrams showing an example of a component amount in the texture component added to the background BG in the first embodiment.

FIGS. 9A to 9D are explanatory diagrams showing an example of a component amount after compressing the color gamut of the texture component added to the background BG in the first embodiment.

FIGS. 11A to 11D are explanatory diagrams showing an example of a component amount in RGB components of an object OBJ prior to adding a texture component.

FIGS. 12A to 12D are explanatory diagrams showing an example of a component amount in the texture component added to the object OBJ in the second embodiment.

FIGS. 14A to 14D are explanatory diagrams showing an example of a component amount after expanding the color gamut of the texture component added to the object OBJ in the second embodiment.

DETAILED DESCRIPTION OF EXEMPLARY EMBODIMENTS

Next, embodiments of the present invention will be explained according to the following order: A. First Embodiment; A-1. Print Processing System; A-2. Print Processing; A-3. Image Processing; B. Second Embodiment; and C. Modified Embodiment.

A. First Embodiment

A-1. Print Processing System

Figure 1:
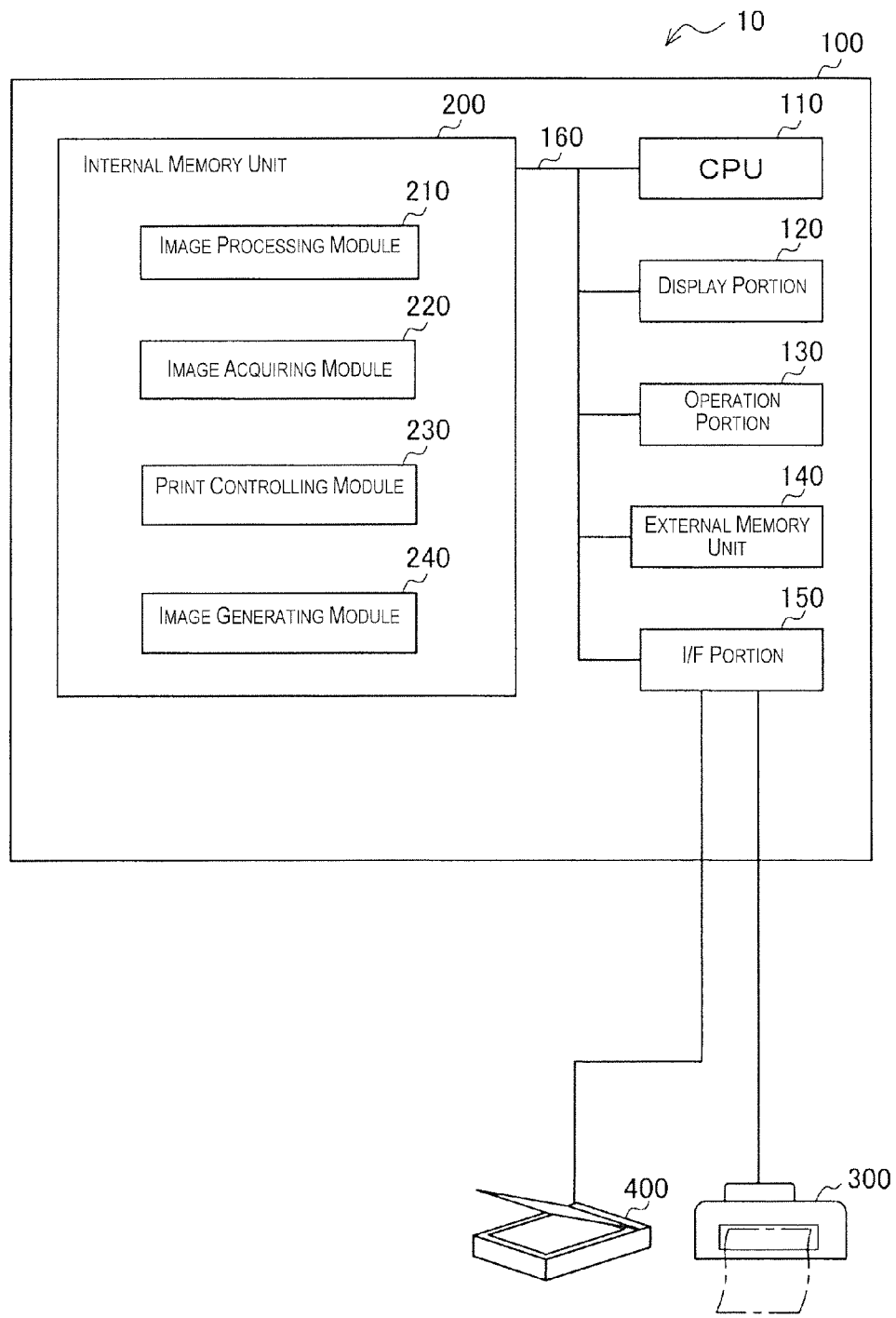
FIG. 1 is an explanatory diagram schematically showing a print processing system 10 according to a first embodiment of the present invention.

FIG. 1 is an explanatory diagram schematically showing a print processing system 10 according to a first embodiment of the present invention.

The print processing system 10 of the present embodiment has a computer 100, an ink-jet printer 300 and a scanner 400 connected to the computer 100.

The computer 100 has a CPU 110, a display portion 120 such as a liquid crystal display, an operating portion 130 such as a keyboard or a mouse, an external memory unit 140 such as a hard disk drive, an interface portion (I/F portion) 150, and an internal memory unit 200 such a ROM or a RAM. The elements of the computer 100 are connected to each other by a bus 160.

The interface portion 150 is connected to external equipment including the ink-jet printer 300 and the scanner 400 by a cable, and communicates information with the external equipment. For example, the interface portion 150 furnishes print data to the ink-jet printer 300. The interface portion 150 also acquires image data generated by the scanner 400. A digital camera may be used instead of the scanner 140. Image data may be an image generated by a computer (CG). The interface portion 150 may be connected to a network so as to communicate information via the network.

The internal memory unit 200 has an image processing module 210, an image acquiring module 220, a print controlling module 230 and an image generating module 240, stored therein. The image processing module 210, the image acquiring module 220, the print controlling module 230 and the image generating module 240 are a computer program for carrying out at least part of print processing described below under a predetermined operating system. Specifically, the image acquiring module 220 is a scanner driver for controlling the scanner 400, and the print controlling module 230 is a printer driver for controlling the ink-jet printer 300. The CPU 110 reads and executes the image processing module 210, the image acquiring module 220, the print controlling module 230 and the image generating module 240 from the internal memory unit 200 so as to implement the functions of these parts. The image processing module 210 of the present embodiment corresponds to the image processing part, and the print controlling module 230 of the present embodiment corresponds to the print controlling part. The computer 100 of the present embodiment corresponds to the image processing device.

The ink-jet printer 300 is a printer which performs printing by discharging ink drops onto a printing medium so as to form ink dots. The ink-jet printer 300 of the present embodiment performs printing with ink of six colors (cyan (C), magenta (M), yellow (Y), black (K), light cyan (LC) and light magenta (LM)).

The scanner 400 is an image scanner which scans an object and generates data showing an image of the scanned object.

A-2. Print Processing

Figure 2:
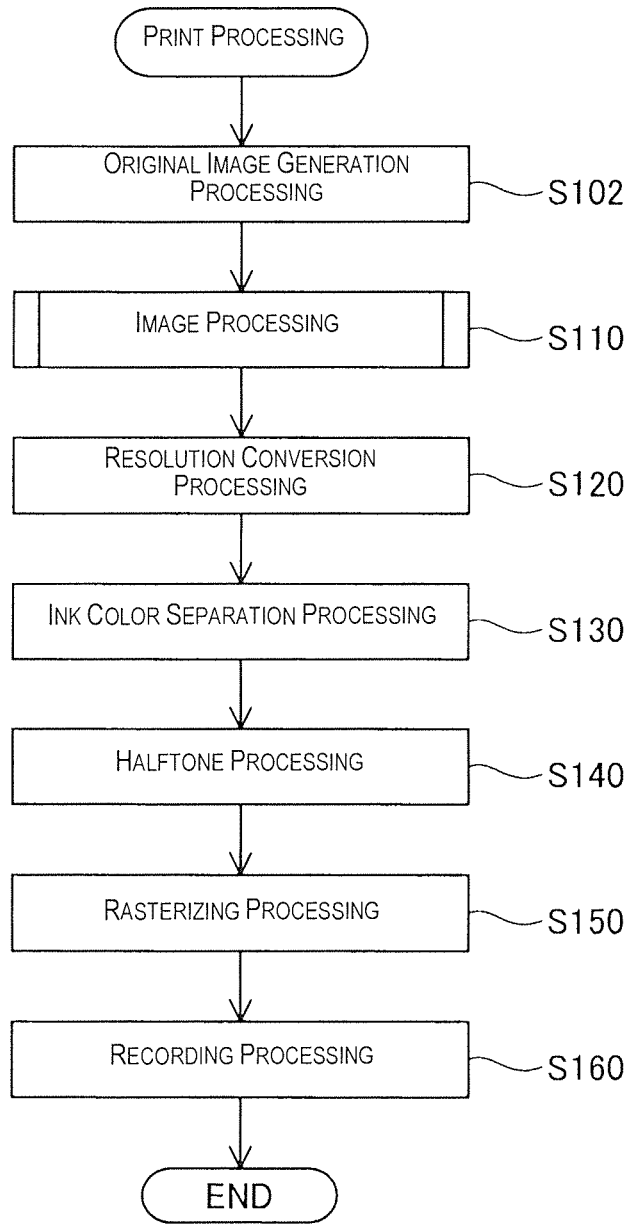
FIG. 2 is a flow chart showing the flow of print processing by the print processing system 10 of the first embodiment.

FIG. 2 is a flow chart showing the flow of print processing by the print processing system 10 of the first embodiment.

The print processing of the present embodiment is processing in which image data is acquired by scanning an original image and printing is performed to wrapping paper as a printing medium after predetermined image processing is performed to the image data so as to produce a wrapping medium for wrapping goods and the like.

First, the image acquiring module 220 scans an original image by controlling the scanner 400, and acquires image data. The original image is designed for a wrapping medium, and for example, is drawn with paints. The image generating module 240 sorts the scanned image data into a background and an object, changes the colors of the background to a predetermined solid color, and generates original image data (step S102).

Next, the image processing module 210 performs predetermined image processing to the original image data (step S110). The image processing will be described in detail later.

Next, the print controlling module 230 performs resolution conversion processing for conforming the resolution of the image data (for example, RGB data), to which image processing has been performed, to the resolution of printing (step S120).

Next, the print controlling module 230 performs ink color separation processing for converting the image data whose resolution has been converted into ink discharge amount data of each ink color of the ink-jet printer 300 (step S130). In the present embodiment, an operator selects an LUT (lookup table) from LUTs of the print controlling module 230 for each kind of a printing medium by operating the operating portion 130. According to the present embodiment, the LUT is arranged such that the ink discharge amount is reduced by approximately 40% in a case of performing ink color separation processing by using the LUT for wrapping paper compared to a case of performing processing by using the LUT for special paper. It is not limited to approximately 40% regarding reduction of the ink discharge amount at the time of being discharged onto a printing medium in the present invention.

Next, the print controlling module 230 performs halftone processing for generating dot arrangement data which shows ON/OFF of ink dots of each color (or size of ink dots) in each pixel by changing ink discharge amount data obtained by the ink color separation processing into binary values (or multiple values) (step S140).

Next, the print controlling module 230 performs rasterizing processing in which the dot arrangement data is rearranged in an order of image generating operations corresponding to the nozzle arrangement of the ink-jet printer 300, the feed amount of a printing medium, and the like (step S150). By the rasterizing processing, print data is generated to identify ink discharge conditions by each nozzle (determination of ink discharge/non-discharge, or ink discharge amount) in each image generating operation. The print data includes command data for commanding each portion of the ink-jet printer 300 to perform a predetermined operation.

Next, the print controlling module 230 performs recording processing which prints images to wrapping paper as a printing medium by repeating an image generation operation with a moving mechanism for discharging ink and a feed operation to feed the printing medium based on the print data (step S160). With this, a wrapping medium for wrapping goods is produced.

A-3. Image Processing

Figure 3:
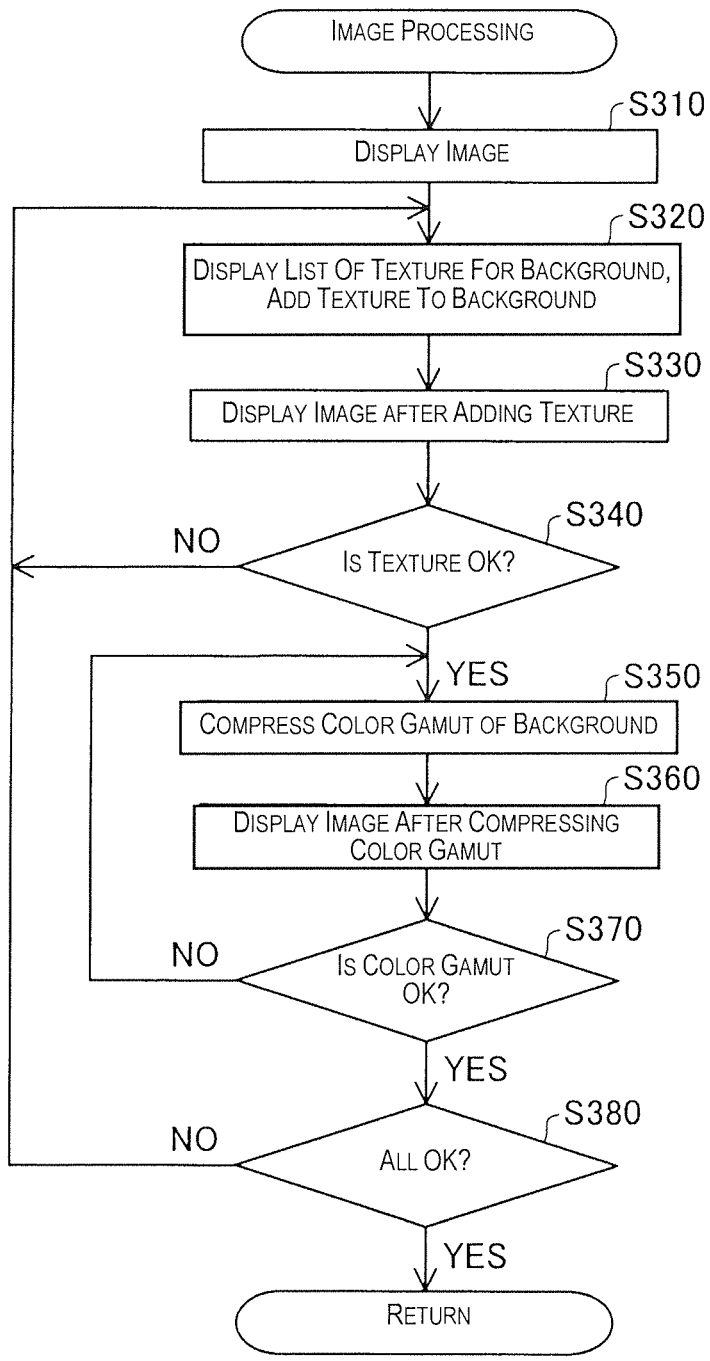
FIG. 3 is a flow chart showing the flow of image processing of the first embodiment.

FIG. 3 is a flow chart showing the flow of image processing of the first embodiment. The image processing (step S110 in FIG. 2) is processing which changes the color gamut of a background in an original image data by adding a texture component to the background.

The image processing module 210 displays an operation screen for performing an operation in the display portion 120. When a file of image data is opened in the operation screen of the image processing module 210, an image is displayed on the display portion 120 based on the image data (step S310).

Figure 4:
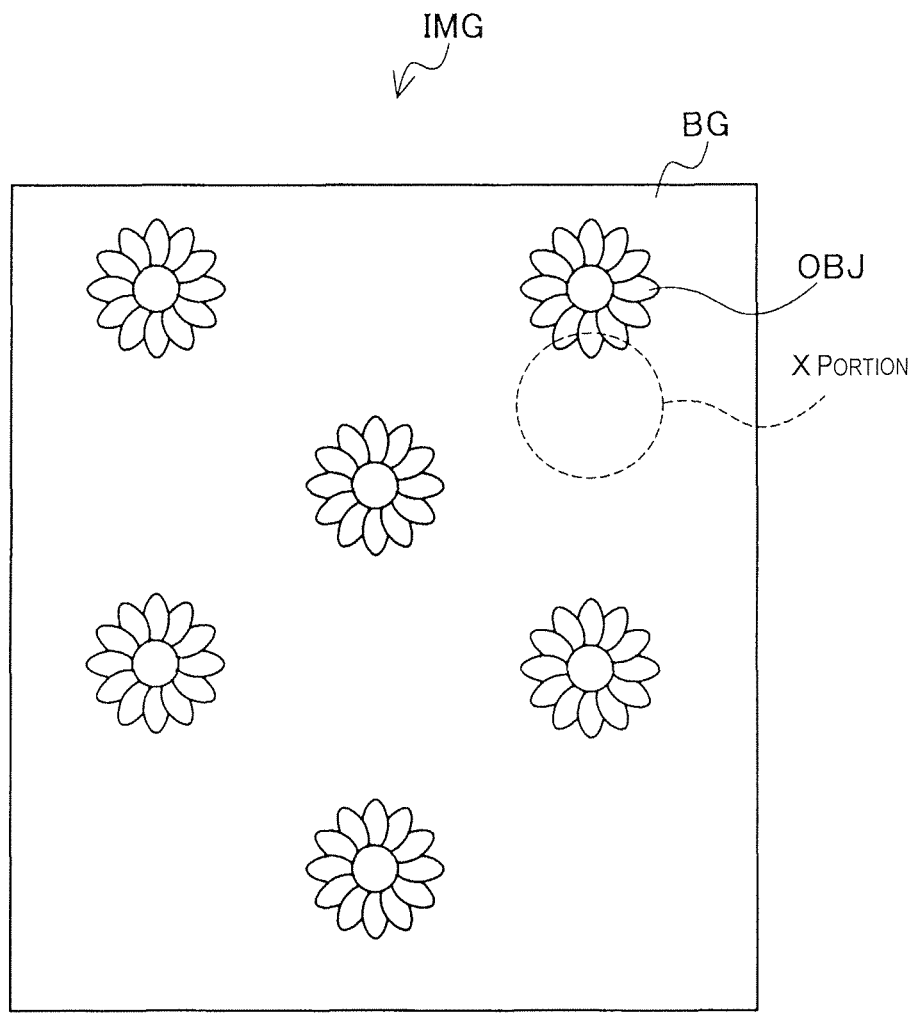
FIG. 4 is an explanatory diagram showing an example of an image displayed on a display portion 120.

FIG. 4 is an explanatory diagram showing an example of an image displayed on the display portion 120. An image IMG is an image generated by original image generation processing. The image IMG is composed of a background BG and a plurality of objects OBJ. The objects OBJ are patterns separately placed on the background BG. Each of the objects may be independent, or some of the objects may be connected or overlapped. When an operator operates the operating portion 130 and thereby selects one of texture components configured and registered in advance, the image processing module 210 adds the selected texture component to the background BG of the image IMG displayed on the display portion 120 (step S320). The selected and added texture component in the present embodiment will be described later.

FIGS. 5A to 5D are explanatory diagrams showing an example of a component amount in RGB components of the background BG prior to adding a texture component. The horizontal axis is a tone value. In the present embodiment, the left end of the tone value as the minimum is 0 and the right end of the tone value as the maximum is 255, which means that there are 256 tones. The vertical axis is a component amount (%). FIG. 5A shows a component amount in which a RED (R) component, a GREEN (G) component, and a BLUE (B) component are added. FIG. 5B shows a component amount of the R component, FIG. 5C shows a component amount of the G component, and FIG. 5D shows a component amount of the B component. The R component of the present embodiment is a component having a 100% component amount in the tone value of 232. The G component is a component having a 100% component amount in the tone value of 229. The B component is a component having a 100% component amount in the tone value of 218. Since each of the RGB components has a 100% component amount in a predetermined tone value, the color of the background BG of the image IMG prior to adding a texture component is a solid mixed color.

FIGS. 6A to 6D are explanatory diagrams showing an example of a component amount in the texture component added to the background BG in the first embodiment. In FIGS. 6A to 6D, in the same manner as in FIGS. 5A to 5D, the horizontal axis is a tone value, and the vertical axis is a component amount (%). FIG. 6A shows a component amount in which an R component, a G component, and a B component are added. FIG. 6B shows a component amount of the R component, FIG. 6C shows a component amount of the G component, and FIG. 6D shows a component amount of the B component. The histogram showing the component amount of FIG. 6A is such that the component amount is the greatest in the tone values of 50 and 206, and the component distribution is symmetrical with respect to the tone value of 128. In this way, the distribution has a peak in certain two tone values with respect to each color component. Also, the distribution has a minimal value in a tone between the two peaks with respect to each color component. The component amount of the R component shown in FIG. 6B, the component amount of the G component shown in FIG. 6C, and the component amount of the B component shown in FIG. 6D have the same histogram in the texture component added to the background BG in the present embodiment. However, the component amount of the RGB in the texture component added to the background BG may be different. The component distribution of the histogram is not limited to one which is obtained in the present embodiment. The texture component shown in FIGS. 6A to 6D corresponds to the first texture component of the present invention.

Figure 7:
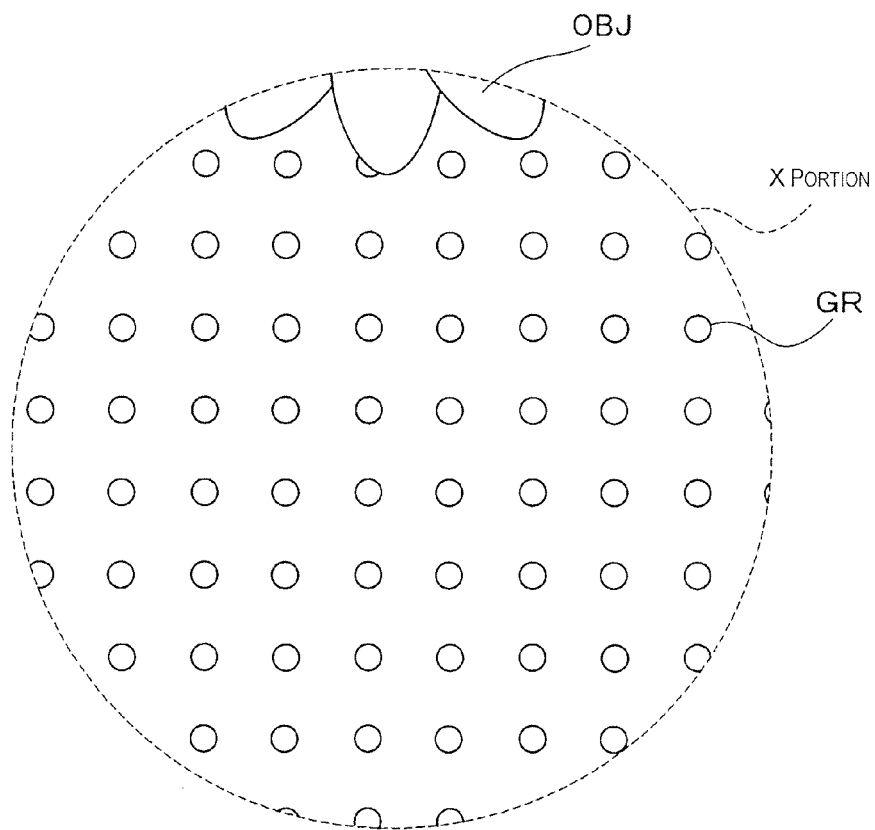
FIG. 7 is an enlarged view of an X portion shown in FIG. 4 after adding a texture component to the background BG in the first embodiment.

FIG. 7 is an enlarged view of an X portion shown in FIG. 4 after adding a texture component to the background BG in the first embodiment. The texture component added to the background BG in the present embodiment is configured by repeating a granular pattern GR having shading so as to impart a texture like Japanese paper to the background BG in combination with compression of the color gamut described later. The frequency of the granular pattern GR of the background BG in the present embodiment is three pieces/mm (three patterns/mm). Here, the frequency of the granular pattern GR of the background BG refers to the number of the granular pattern GR contained per unit distance. The granular pattern GR of the background BG corresponds to the first pattern in the present invention.

After the texture component is added to the background BG of the image IMG, the image IMG to which the texture component has been added is displayed on the display portion 120 (step S330). The texture component added to the background BG in the present embodiment is such that existence or non-existence of the texture component cannot be confirmed unless watched carefully close to the image IMG. The texture component added to the background BG is not limited to one in the present embodiment, but it may be possible to use one in which existence or non-existence of the texture component can be confirmed when observed from a distance.

If an operator wishes to change the texture component added to the background BG of the image IMG (step S340: NO), the operator selects a texture component to be added to the background BG again and adds the texture component to the background BG (step S320).

If an operator does not wish to change the texture component added to the background BG of the image IMG (step S340: YES), the operator operates the operating portion 130 and thereby compresses the color gamut of the background BG of the image IMG displayed on the display portion 120 (step S350).

Figure 8:
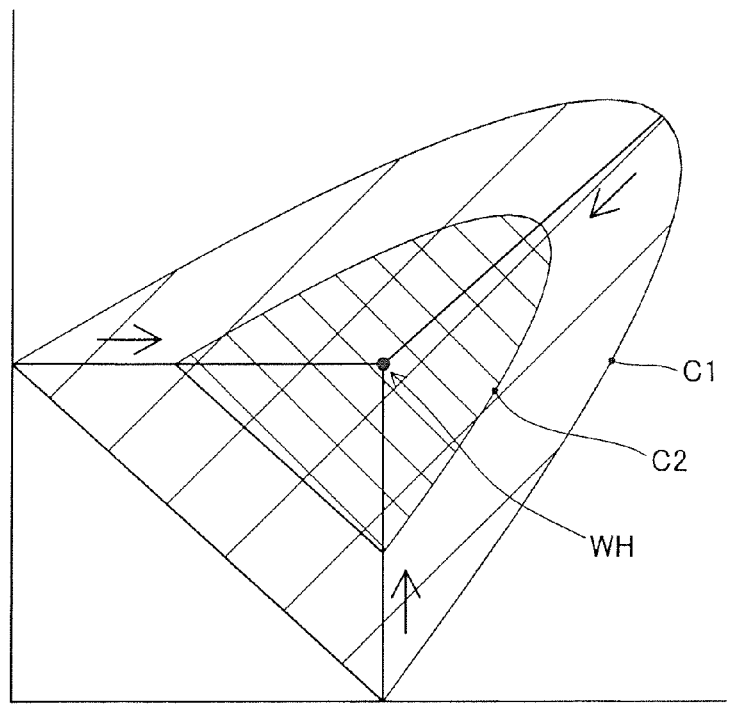
FIG. 8 is a chromaticity diagram regarding compression of the color gamut in the first embodiment.

FIG. 8 is a chromaticity diagram regarding compression of the color gamut in the first embodiment. The color gamut of the background BG prior to compressing the color gamut is a region inside C1 having a horseshoe shape. A point WH is a point of achromatic white color in FIG. 8. In the present embodiment, the color gamut is compressed with similarity from C1 to C2 having a horseshoe shape (in directions shown by the arrows) with respect to the point WH. By compressing the color gamut, the amplitude, which is a difference between a maximum tone value and a minimum tone value of the background BG to which a texture component has been added, becomes smaller than that prior to compressing the color gamut. The method for compressing the color gamut is not limited to similar compression with respect to the point WH as in the present embodiment.

FIGS. 9A to 9D are explanatory diagrams showing an example of a component amount after compressing the color gamut of the texture component added to the background BG in the first embodiment. The horizontal axis is a tone value, and the vertical axis is a component amount (%). FIG. 9A shows a component amount in which an R component, a G component, and a B component are added. FIG. 9B shows a component amount of the R component, FIG. 9C shows a component amount of the G component, and FIG. 9D shows a component amount of the B component. As shown in FIG. 9A, in the present embodiment, the maximum tone value of the background BG after compressing the color gamut is 240 and the minimum tone value thereof is 200. Thus, the amplitude in the background BG is 40. As shown in FIG. 9B, the R component has a symmetrical component distribution with respect to the tone value 232 of the R component prior to adding a texture component to the background BG and the component amount is the greatest in the tone values of 227 and 237. As shown in FIG. 9C, the G component has a symmetrical component distribution with respect to the tone value of 229 of the G component prior to adding a texture component to the background BG and the component amount is the greatest in the tone values of 222 and 236. As shown in FIG. 9D, the B component has a symmetrical component distribution with respect to the tone value of 218 of the B component prior to adding a texture component to the background BG and the component amount is the greatest in the tone values of 206 and 230. The distribution has a peak in certain two tone values with respect to each color component. Also, the distribution has a minimal value in a tone between the two peaks with respect to each color component. An operator can freely set the compression ratio of the color gamut of the RGB of the texture component added to the background BG. As shown in FIGS. 9B, 9C and 9D, it is preferable to arrange the width between the two peaks to be smaller in an order of the B component, the G component, and the R component. Specifically, it is preferable to arrange the difference between the tone values of the two peaks to be the greatest in the B component such as 24, to be the second greatest in the G component such as 14, and to be the smallest in the R component such as 10. However, the value of the difference between the tone values of the peaks in each component is not limited to the above. The relationship among the widths between the two peaks of the B component, the G component, and the R component is not limited to the order of this second embodiment. For example, the widths between the two peaks may be the same in some of the components. Further, the compression ratio of the color gamut may be different from the compression ratio of the present embodiment, and compression may be performed with respect to an optional tone value as the center. Furthermore, the amplitude of the background BG is not limited to the value of the present embodiment.

After the color gamut of the background BG of the image IMG is compressed, the image IMG in which the color gamut has been compressed is displayed on the display portion 120 (step S360). If an operator wishes to redo compression of the color gamut of the background BG of the image IMG (step S370: NO), the operator can compress the color gamut of the background BG again (step S350).

If an operator does not wish to redo compression of the color gamut of the background BG of the image IMG (step S370: YES), then the operator judges whether or not there is a problem with the entire image processing to the image IMG. In a case where the operator wishes to change the texture component added to the image IMG or the compression of the color gamut (step S380: NO), the operator selects a texture component to be added to the background BG again and adds to the background BG (step S320). In a case where the operator determines that there is no problem with the entire image processing to the image IMG (step S380: YES), the image processing will end.

As explained above, according to the print processing system 10 of the present embodiment, the image processing module 210 can add a texture component to the background BG of the image IMG. Here, if the texture components of the background BG and the object OBJ neighboring in the image IMG are different, the background BG and the object OBJ are often discontinuous in terms of depth (different in the depth discrimination threshold). To an observer of the image IMG, therefore, the distance between the observer and the background BG and the distance between the observer and the object OBJ look different by visual effects even if the background BG and the object OBJ exist in the same image IMG. The object OBJ looks conspicuous compared to the background BG by adding a texture component to the background BG. Consequently, according to the print processing system 10 of the present embodiment, when an image IMG to which a texture component has been added to the background BG is printed with the ink-jet printer 300, the discharge amount of ink can be decreased while controlling deterioration in image quality even if the amount of ink discharged to a printing medium is smaller than the amount of ink that would be discharged if printing was performed using the image IMG prior to adding a texture component.

According to the print processing system 10 of the present embodiment, since the print controlling module 230 can reduce the amount of ink discharged to a printing medium by the ink-jet printer 300, printing can be performed to a printing medium having no coating layer without the occurrence of smearing or bleeding through. Further, since the amount of ink discharged to a wrapping medium can be reduced, the cost of ink can be reduced.

According to the print processing system 10 of the present embodiment, the image processing module 210 compresses the color gamut of the background BG of the image IMG after a texture component has been added to the background BG. This causes a color gamut effect which increases the color gamut for visibility of an object in circumstances where the surrounding color gamut is low. The object OBJ thus looks clear with respect to the background BG. Consequently, according to the print processing system 10 of the present embodiment, the discharge amount of ink can be decreased while controlling deterioration in image quality even if the amount of ink discharged to a printing medium is smaller than the amount of ink that would be discharged if printing was performed using the image IMG prior to adding a texture component.

B. Second Embodiment

Figure 10:
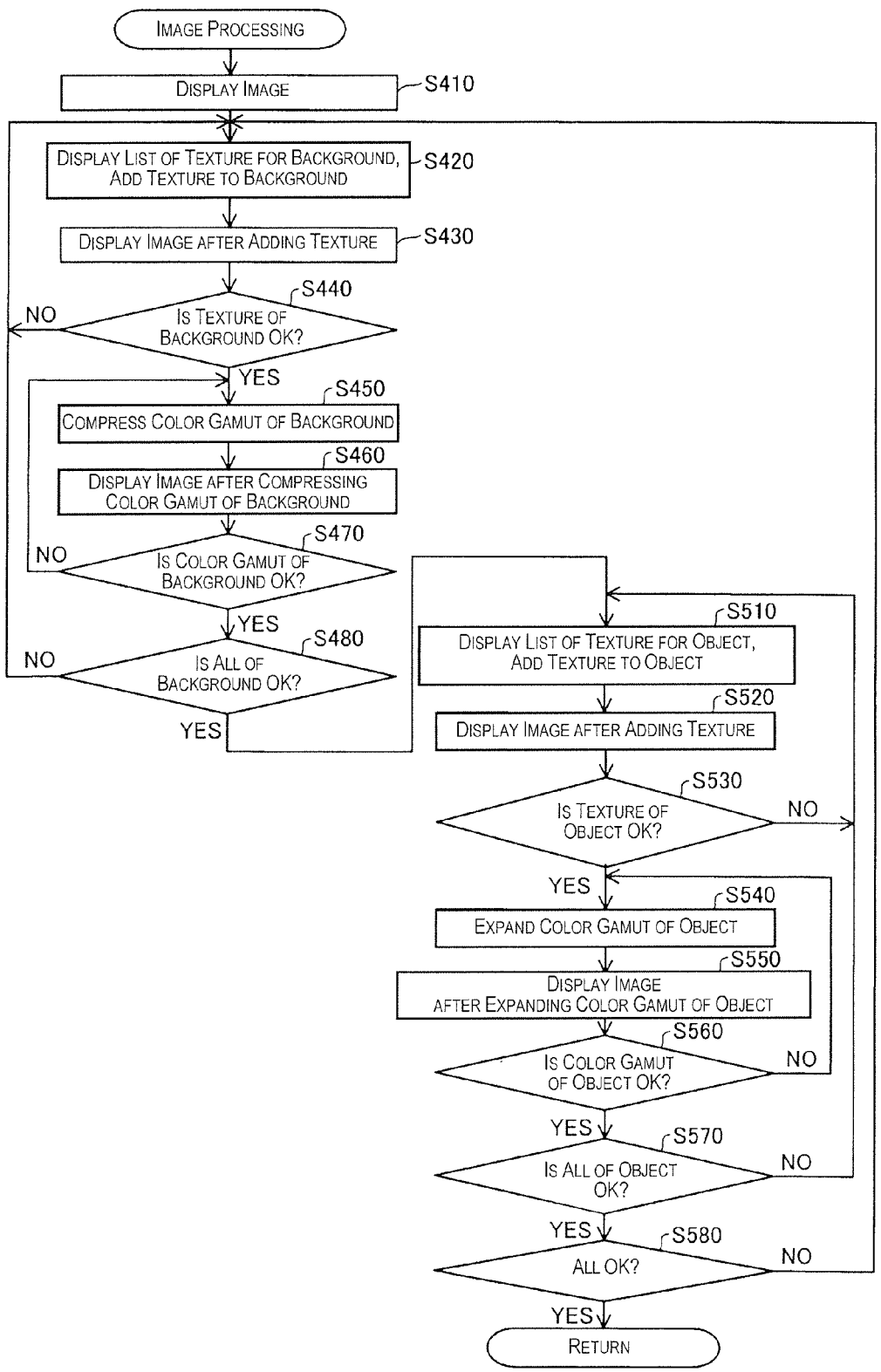
FIG. 10 is a flow chart showing the flow of image processing of a second embodiment.

FIG. 10 is a flow chart showing the flow of image processing of a second embodiment. The image processing of the second embodiment is different from the image processing of the first embodiment in that a texture component is added to the object OBJ of the image IMG as well as to the background BG of the image IMG, and expansion processing is performed to the color gamut of the texture component added to the object OBJ. Also, in the second embodiment, the original image to which image processing is performed is CG, and the color of the background BG in the image IMG is a predetermined solid color. The color of the object OBJ is a predetermined solid color or predetermined solid colors. That is, in the original image of the second embodiment, neither the background BG nor the object OBJ has a texture component.

Processing from step S410 to step S480 in FIG. 10 is the same as processing from step S310 to step S380 of the first embodiment shown in FIG. 3. An operator selects a texture component to be added to the object OBJ after image processing to the background BG (step S510).

FIGS. 11A to 11D are explanatory diagrams showing an example of a component amount in RGB components of the object OBJ prior to adding a texture component. In the same manner as in FIGS. 5A to 5D, the horizontal axis is a tone value, and the vertical axis is a component amount (%). FIG.

11A shows a component amount of the object OBJ in which the R component shown in FIG. 11B, the G component shown in FIG. 11C, and the B component shown in FIG. 11D are added. FIG. 11B shows the component amount of the R component, FIG. 11C shows the component amount of the G component, and FIG. 11D shows the component amount of the B component. The R component of the second embodiment is a component having a 100% component amount in the tone value of 235. The G component of the present embodiment is a component having a 100% component amount in the tone value of 160. The B component of the present embodiment is a component having a 100% component amount in the tone value of 240. Since each of the RGB components has a 100% component amount in a predetermined tone value, the color of the object OBJ of the image IMG prior to adding a texture component is a solid mixed color.

FIGS. 12A to 12D are explanatory diagrams showing an example of a component amount in the texture component added to the object OBJ in the second embodiment. In FIGS. 12A to 12D, in the same manner as in FIGS. 11A to 11D, the horizontal axis is a tone value, and the vertical axis is a component amount (%). FIG. 12A shows a component amount of the object OBJ in which the R component shown in FIG. 12B, the G component shown in FIG. 12C, and the B component shown in FIG. 12D are added. The texture component added to the object OBJ in the second embodiment is a histogram of the component amount of the R component shown in FIG. 12B, the G component shown in FIG. 12C, and the B component shown in FIG. 12D. However, the component distribution of the histogram of the texture component added to the object OBJ is not limited to one which is obtained in the second embodiment. The texture component shown in FIGS. 12A to 12D corresponds to the second texture component of the present invention.

The texture component added to the object OBJ in the second embodiment is configured by repeating a curve line having shading. A texture like Japanese paper to which a pattern is painted in watercolors is imparted to the image IMG in combination with expansion of the color gamut described later. The frequency of the curve line of the object OBJ in the second embodiment is 0.5 line/mm (0.5 pattern/mm). The curve line having shading added to the object OBJ corresponds to the second pattern in the present invention.

After the texture component is added to the object OBJ of the image IMG, the image IMG to which the texture component has been added is displayed on the display portion 120 (step S520).

If an operator wishes to change the texture component added to the object OBJ of the image IMG (step S530: NO), the operator selects a texture component to be added to the object OBJ again and adds the texture component to the object OBJ (step S510).

If an operator does not wish to change the texture component added to the object OBJ of the image IMG (step S530: YES), the operator operates the operating portion 130 and thereby expands the color gamut of the object OBJ of the image IMG displayed on the display portion 120 (step S540).

Figure 13:
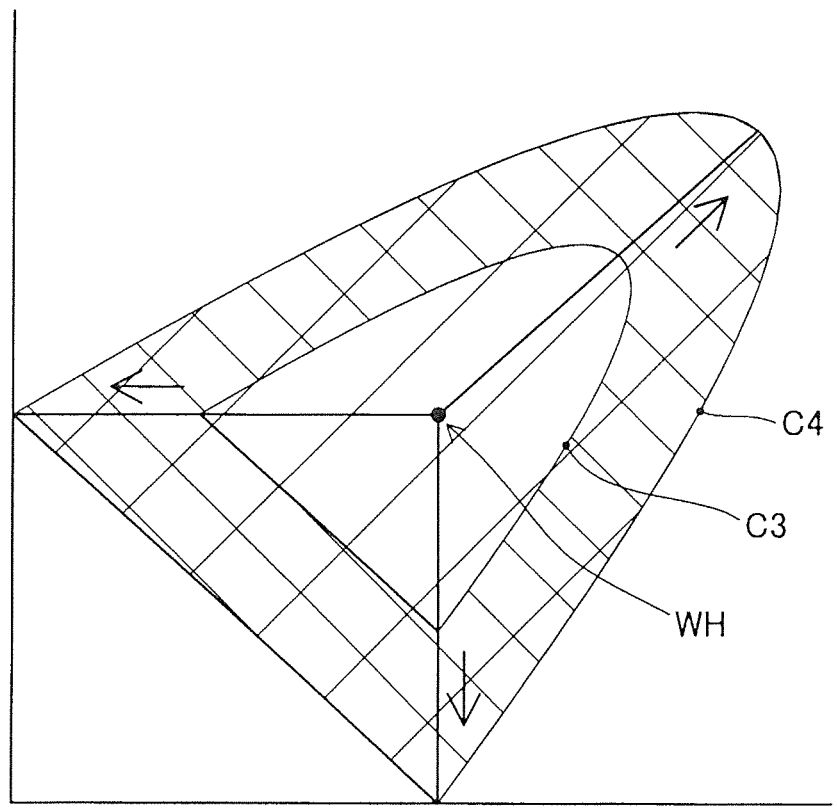
FIG. 13 is a chromaticity diagram regarding expansion of the color gamut in the second embodiment.

FIG. 13 is a chromaticity diagram regarding expansion of the color gamut in the second embodiment. The color gamut of the object OBJ prior to expanding the color gamut is a region inside C3 having a horseshoe shape. In the same manner as in FIG. 8, a point WH is a point of achromatic white color in FIG. 13. In the second embodiment, the color gamut is expanded with similarity from C3 to C4 having a horseshoe shape (in directions shown by the arrows) with respect to the point WH. By expanding the color gamut, the amplitude of the texture pattern of the object OBJ in the second embodiment becomes greater than that prior to expanding the color gamut. The method for expanding the color gamut is not limited to similar expansion with respect to the point WH as in the second embodiment.

FIGS. 14A to 14D are explanatory diagrams showing an example of a component amount after expanding the color gamut of the texture component added to the object OBJ in the second embodiment. The horizontal axis is a tone value, and the vertical axis is a component amount (%). FIG. 14A shows a component amount in which an R component, a G component, and a B component are added. FIG. 14B shows a component amount of the R component, FIG. 14C shows a component amount of the G component, and FIG. 14D shows a component amount of the B component. As shown in FIG. 14A, in the second embodiment, the maximum tone value of the object OBJ after expanding the color gamut is 250 and the minimum tone value thereof is 50. Thus, the amplitude in the object OBJ is 200. As shown in FIG. 14B, in the second embodiment, the R component is expanded, for example, with respect to the tone value of 235 in which the R component is 100% prior to adding a texture component to the object OBJ, and thereby the tone value is adjusted from 50 to 250. As shown in FIG. 14C, in the same manner as the R component, the G component is expanded, for example, with respect to the tone value of 160 in which the G component is 100% prior to adding a texture component to the object OBJ, and thereby the tone value is adjusted from 50 to 250. As shown in FIG. 14D, the B component is expanded, for example, with respect to the tone value of 240 in which the B component is 100% prior to adding a texture component to the object OBJ, and thereby the tone value is adjusted from 50 to 250. An operator can freely set the expansion ratio of the color gamut of the RGB of the texture component added to the object OBJ. The expansion ratio of the color gamut may be different from the expansion ratio of the second embodiment, and expansion may be performed by setting an optional tone value as a reference. The width of the tone value to be adjusted is not limited to one from 50 to 250 as in the second embodiment, and also the amplitude of the object OBJ is not limited to the value of the second embodiment.

After the color gamut of the object OBJ of the image IMG is expanded, the image IMG in which the color gamut has been expanded is displayed on the display portion 120 (step S550). If an operator wishes to redo expansion of the color gamut of the object OBJ of the image IMG (step S560: NO), the operator can expand the color gamut of the object OBJ again (step S540).

If an operator does not wish to redo expansion of the color gamut of the object OBJ of the image IMG (step S560: YES), then the operator judges whether or not there is a problem with the entire image processing to the object OBJ of the image IMG. In a case where the operator wishes to change the texture component added to the object OBJ of the image IMG or the expansion of the color gamut (step S570: NO), the operator selects a texture component to be added to the object OBJ again and adds to the object OBJ (step S510).

If the operator determines that there is no problem with the image processing to the object OBJ of the image IMG (step S570: YES), then the operator judges whether or not there is a problem with the image processing to the image IMG. In a case where the operator wishes to change the texture component added to the background BG or the object OBJ of the image IMG or the color gamut (step S580: NO), the operator selects a texture component to be added to the background BG again and adds to the object OBJ (step S420). In a case where the operator determines that there is no problem with the entire image processing to the image IMG (step S580: YES), the image processing will end.

As explained above, according to the print processing system 10 of the second embodiment, the image processing module 210 can add a texture component to the object OBJ of the image IMG. Also, the color gamut of the added texture component can be expanded. The texture component added to the background BG and the texture component added to the object OBJ thus are different. The object OBJ looks clear with respect to the background BG by color gamut effects compared to the case of the first embodiment in which a texture component is added only to the background BG. Consequently, according to the print processing system 10 of the second embodiment, the discharge amount of ink can be decreased while controlling deterioration in image quality even if the amount of ink discharged to a printing medium is smaller than the amount of ink that would be discharged if printing was performed using the image IMG prior to adding a texture component.

In the print processing system 10 of the second embodiment, the texture component added to the background BG of the image IMG has a pattern configured by repeating a granular pattern GR having frequency of three patterns/mm. The texture component added to the object OBJ of the image IMG has a pattern configured by repeating a curve line having frequency of 0.5 pattern/mm. The frequency of the texture component added to the background BG is thus greater than the frequency of the texture component added to the object OBJ. Further, the texture component added to the background BG has a pattern configured by repeating a granular pattern GR having amplitude of 40. The texture component added to the object OBJ has a pattern configured by repeating a curve line having amplitude of 200. The amplitude of the texture component added to the background BG is thus smaller than the amplitude of the texture component added to the object OBJ. Therefore, the background BG and the object OBJ are different in the depth discrimination threshold, and the object OBJ looks closer in its position than the background BG by visual effects. Consequently, according to the print processing system 10 of the second embodiment, the discharge amount of ink can be decreased while controlling deterioration in image quality even if the amount of ink discharged to a printing medium is smaller than the amount of ink that would be discharged if printing was performed using the image IMG prior to adding a texture component.

C. Modified Embodiment

The present invention is not limited to the above-described examples or embodiments, and various modifications may be possible without departing from the scope of the present invention. For example, the following modifications are possible.

C1. Modified Embodiment 1

The structure of the computer 100 in the above-described embodiments is only an example, and various modifications are possible. Although the color gamut of the texture component added to the background BG of the image IMG is compressed in the above-described embodiments, the color gamut may be expanded. Also, although the color gamut of the texture component added to the object OBJ of the image IMG is expanded, the color gamut may be compressed.

In the above-described embodiments, the frequency of the texture component added to the background BG of the image IMG is greater than the frequency of the texture component added to the object OBJ of the image IMG. However, the frequency of the texture component added to the background BG of the image IMG may be smaller than the frequency of the texture component added to the object OBJ of the image IMG. Also, the amplitude of the texture component added to the background BG of the image IMG is smaller than the amplitude of the texture component added to the object OBJ of the image IMG. However, the amplitude of the texture component added to the background BG of the image IMG may be greater than the amplitude of the texture component added to the object OBJ of the image IMG. Then the background BG and the object OBJ are different in the depth discrimination threshold, and the object OBJ looks farther in its position than the background BG by visual effects. The object OBJ seems like a pattern embedded into the background BG and creates an impression of a pressed mark. The object OBJ thus looks conspicuous with respect to the background BG by visual effects. Consequently, in this print processing system 10, the discharge amount of ink can be decreased while controlling deterioration in image quality even if the amount of ink discharged to a printing medium is smaller than the amount of ink that would be discharged if printing was performed using the image IMG prior to adding a texture component.

C2. Modified Embodiment 2

In the above-described second embodiment, after a texture component is added to the object OBJ of the image IMG, the color gamut of the added texture component is expanded. However, it is possible to change the color gamut of the object OBJ which originally exists in the image IMG prior to performing image processing. As a result, by performing image processing to change the color gamut of the object OBJ of the image IMG of a target scanned with the scanner 400 and the like, the object OBJ looks more conspicuous with respect to the background BG by visual effects compared to the image IMG prior to performing image processing.

C3. Modified Embodiment 3

In the above-described embodiments, the tone value of the RGB components of the image IMG prior to the image processing is such that the component amount in a certain tone value is 100%. However, it is not limited to this value. The background BG and the object OBJ do not need to have a component amount of 100% in a certain tone value, and may have shading. The RGB components of the texture component added to the background BG and the object OBJ are not limited to the above-described embodiments. Values and methods for compression and expansion of the color gamut are not limited to the above-described embodiments. However, in terms of perception and recognition effects based on the difference in the depth determination threshold, the frequency of the texture component of the background BG is preferably from 0.5 pattern/mm to 6 patterns/mm. More preferably, the frequency is in the range of 2.5 patterns/mm to 3.5 patterns/mm with respect to the texture component of the background BG having a granular pattern GR in the first embodiment. Also, the frequency is preferably in the range of 1 pattern/mm to 2 patterns/mm with respect to the texture component added to the background BG having a pattern in which diagonal lines are repeated. Regarding the relationship between the amplitude of the texture component of the background BG and the amplitude of the texture component of the object OBJ, the amplitude of the texture component of the object OBJ is preferably 1.2 times or more than the amplitude of the texture component of the background BG.

C4. Modified Embodiment 4

According to the above-described embodiments, the amount of ink discharged to a printing medium can be decreased, and moreover deterioration of the image quality can be controlled compared to the image IMG prior to the image processing. Consequently, the printing medium is not limited to a wrapping paper, and it may be special paper having a coating layer or a printing medium other than paper. Also, the reduction amount of the ink amount discharged by the ink-jet printer 300 is not limited to the values of the above-described embodiments.

C5. Modified Embodiment 5

In the above-described embodiments, the color gamut of the background BG is compressed after the texture component to be added to the background BG is selected. Then the color gamut of the object OBJ is expanded after the texture component to be added to the object OBJ is selected. However, the order of selecting the texture component or changing the color gamut is not limited to the above-described embodiments. A texture component may be added to the background BG after the texture component is added to the object OBJ. An operator may order and select which of the background BG and the object OBJ undergoes image processing first by the operating portion 130. Further, instead of changing the color gamut after adding a texture component to the background BG or the object OBJ, it may be possible to add a texture component, whose color gamut has been changed in advance, to the background BG or the object OBJ.

In the above-described embodiments, the color of the background BG is a predetermined solid color in the original image IMG to which a texture component is added. However, this is not essential. Also, even if the background BG of the original image IMG originally has a texture component, a texture component may further be added. Similarly, a texture component may further be added to the object OBJ irrespective of the color or texture component of the object OBJ in the original image IMG.

C6. Modified Embodiment 6

In the above-described embodiments, image processing is performed by using the computer 100 as the image processing device. However, it may be possible to use a stand-alone printer or display device having image processing functions as the image processing device, and in this instance the above-described image processing is performed in the printer or the display device. Alternatively, a printer driver, a video driver or an image processing application (program) may be used instead of using a hardware structure such as an image processing device. Here, the display device includes a CRT, a liquid crystal display, and a projector which have image quality adjusting functions to image data so as to display output images based on the image data in which image quality has been adjusted.

C7. Modified Embodiment 7

In the above-described embodiments, part of the structure achieved by hardware may be replaced with software. Conversely, part of the structure achieved by software may be replaced with hardware.

C8. Modified Embodiment 8

In a case where part or all of the functions of the present invention is achieved by software, it is possible to provide such software (computer program) in a form stored in a recording medium which can be read by a computer. In this invention, "a recording medium which can be read by a computer" is not limited to a portable recording medium such as a flexible disk or CD-ROM, but includes an internal memory unit inside a computer such as various RAMs or ROMs and an external memory unit fixed to a computer such as a hard disk.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:
1. An image processing device comprising;
an image processing part configured to perform image processing to an original image including a background and an object by adding a first texture component to at least the background, the first texture component being a texture component in which a predetermined first pattern having shading is repeated; and
a print controlling part configured to produce print data for printing by an ink-jet method based on an image,
the print controlling part producing the print data such that a discharge amount of ink per unit area is smaller in a print mode in which the printing is performed based on the image after the image processing than in a print mode in which the printing is performed without the image processing.
2. The image processing device according to claim 1, wherein
the image processing includes background color gamut adjustment processing which changes a color gamut of the background in the original image after adding the first texture component.

3. The image processing device according to claim 2, wherein
the background color gamut adjustment processing is processing which compresses the color gamut of the background in the original image after adding the first texture component.

4. The image processing device according to claim 1, wherein
the image processing includes object color gamut adjustment processing which changes a color gamut of the object in the original image.

5. The image processing device according to claim 4, wherein
the object color gamut adjustment processing is processing which expands the color gamut of the object in the original image.

6. An image processing method comprising:
performing image processing to an original image including a background and an object by adding a first texture component to at least the background, the first texture component being a texture component in which a predetermined first pattern having shading is repeated,
the image processing including processing which adds a second texture component to the object,
the second texture component being a texture component in which a predetermined second pattern having shading different from the first pattern is repeated, and
a frequency of the first texture component and a frequency of the second texture component being different from each other.

7. The image processing method according to claim 6, wherein
the frequency of the first texture component is greater than the frequency of the second texture component.

8. The image processing method according to claim 6, wherein
an amplitude of the first texture component and an amplitude of the second texture component are different from each other.

9. The image processing method according to claim 8, wherein
the amplitude of the first texture component is smaller than the amplitude of the second texture component.

10. A printed material wherein an image, in which image processing is performed to an original image including a background and an object by adding a first texture component to at least the background, is printed on a printing medium by an ink-jet method, the first texture component being a texture component in which a predetermined first pattern having shading is repeated and the first texture component being configured to make a distance between an observer and the background and a distance between the observer and the object look differently.

11. The printed material according to claim 10, wherein
a second texture component different from the first texture component is added to the object.

* * * * *